United States Patent
Mizukoshi

[11] Patent Number: 5,098,342
[45] Date of Patent: Mar. 24, 1992

[54] TRIPOD TYPE CONSTANT VELOCITY JOINT

[75] Inventor: Yasumasa Mizukoshi, Fujisawa, Japan

[73] Assignee: Nippon Seiko Kabushiki Kaisha, Tokyo, Japan

[21] Appl. No.: 457,507

[22] Filed: Dec. 27, 1989

[30] Foreign Application Priority Data

Apr. 27, 1989 [JP] Japan ................... 1-105959

[51] Int. Cl.$^5$ ............................................. F16D 3/26
[52] U.S. Cl. .................................. 464/111; 464/132; 464/905
[58] Field of Search ............... 464/111, 123, 124, 905, 464/132

[56] References Cited

U.S. PATENT DOCUMENTS

| | | | |
|---|---|---|---|
| 3,818,721 | 6/1974 | Wahlmark | 464/111 |
| 4,192,154 | 3/1980 | Nakamura et al. | 464/111 |
| 4,224,806 | 9/1980 | Kobayashi | 464/111 |
| 4,604,077 | 8/1986 | Orain | 464/111 |
| 4,674,993 | 6/1987 | Mazziotti et al. | 464/111 |
| 4,747,803 | 5/1988 | Kimata et al. | 464/111 |
| 4,786,270 | 11/1988 | Iwasaki | 464/111 |
| 4,854,917 | 8/1989 | Mizukoshi | 464/111 |

FOREIGN PATENT DOCUMENTS

| | | |
|---|---|---|
| 62-4624 | 1/1987 | Japan . |
| 62-49022 | 1/1987 | Japan . |
| 62-20225 | 2/1987 | Japan . |
| 62-49023 | 3/1987 | Japan . |
| 63-158327 | 7/1988 | Japan . |
| 2161246 | 1/1986 | United Kingdom . |

Primary Examiner—Daniel P. Stodola
Assistant Examiner—William G. Battista, Jr.
Attorney, Agent, or Firm—Shapiro and Shapiro

[57] ABSTRACT

In a tripod type constant velocity joint a tripod is disposed within a cylindrical housing such that three equiangularly spaced trunnions of the tripod are received within corresponding recesses of the housing. Each trunnion has a spherical roller mounted thereon through a plurality of rolling bearing members, and a cylindrical roller mounted on the spherical roller. An inner peripheral concave spherical surface of the cylindrical roller is in intimate sliding contact with an outer peripheral convex spherical surface of the spherical roller, and an outer cylindrical surface of the cylindrical roller is in rolling contact with the opposite side surfaces of the corresponding recess. The rolling bearing members, the spherical rollers, and the cylindrical rollers are disposed within a circle formed by linking the ends of the trunnions together.

4 Claims, 3 Drawing Sheets

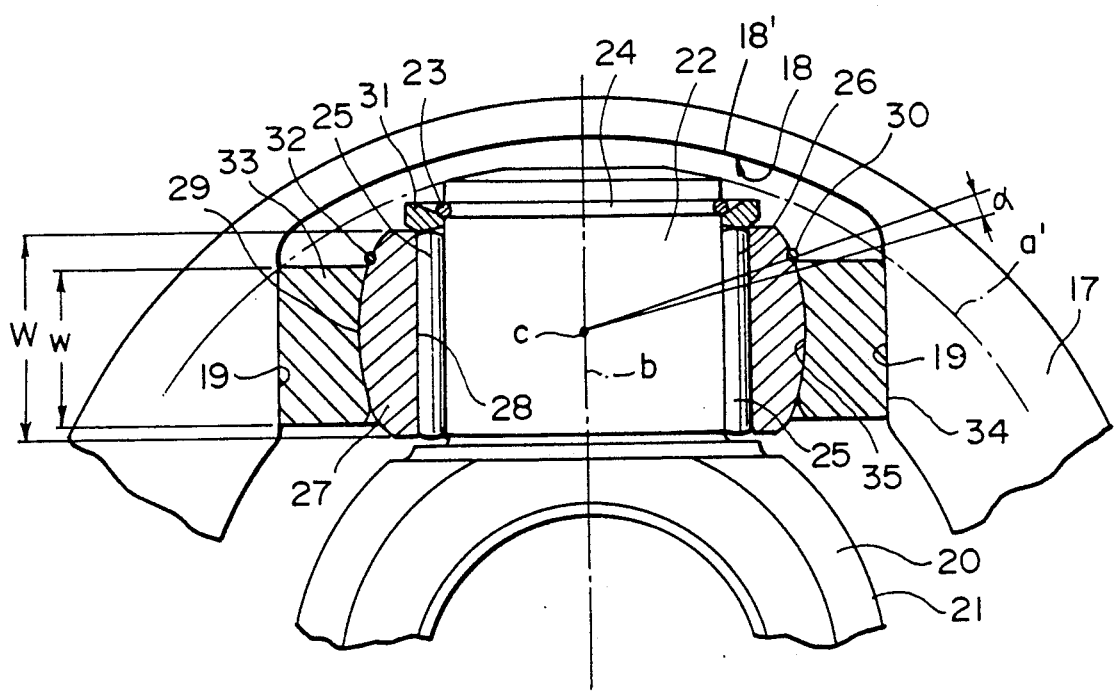
F I G. 2

TRIPOD TYPE CONSTANT VELOCITY JOINT

BACKGROUND OF THE INVENTION

1. Field of the Invention

This invention relates to a tripod type constant velocity joint incorporated, for example, in the driving system of an automotive vehicle and utilized to transmit a rotative driving force between non-aligned rotary shafts.

2. Related Background Art

In the drive train of a forwardly disposed engine front wheel drive vehicle (FF type vehicle), there arises a case where the portion between the rotary shaft on the wheel side and the rotary shaft on the engine side becomes bent at a relatively great angle. For this reason, to effect transmission of a rotative driving force which is constant, i.e., free of any change in rotational angular speed with rotation, between the two rotary shafts, and enable the automotive vehicle to run smoothly, it is ncessary to connect the two rotary shafts together through a constant velocity joint.

Therefore, it has heretofore been known to use various constant velocity joints to connect the end portions of rotary shafts which are not coaxially aligned with each other. An example will hereinafter be described with reference to FIG. 4 of the accompanying drawings.

In a constant velocity joint 100 according to the prior art shown in FIG. 4, recesses 103 extending in a direction of a first axis are formed in radial directions at equal intervals at three locations (only one of which is shown in FIG. 4) on the inner peripheral surface of a hollow cylindrical housing 102 fixed to the end portion of a first rotary shaft (not shown) such as the rotary shaft on the engine side, and inner side surfaces 104 opposed to each other in the circumferential direction are made into arcuately concave surfaces centered about the axis of the recesses 103.

On the other hand, a tripod 105 fixed to the end portion of a second rotary shaft (not shown) such as the rotary shaft on the wheel side is constructed by securing three pillar-like trunnions 107, radially protruding and extending into the three recesses 103 formed in the housing 102, to the outer peripheral surface of a boss portion 106 to be fixed to the end portion of said second rotary shaft. A spherical roller 108 whose outer peripheral surface is made into a spherical convex surface is rotatably supported around each trunnion 107 through a roller bearing (herein including a needle bearing) 109. The housing 102 and the tripod 105 are combined together by fitting the spherical rollers 108 into the recesses 103 in the inner peripheral surface of the housing 102, thereby constituting the constant velocity joint 100.

In the above-described constant velocity joint 100, when, for example, the first rotary shaft rotates, this rotational force is transmitted from the housing 102 to the boss portion 106 of the tripod through the spherical rollers 108, the roller bearings 109 and the trunnions 107, thereby rotating the second rotary shaft having the boss portion 106 fixed to the end portion thereof. In this fashion, a constant speed is secured between the first and second rotary shafts, as is well known.

It is known that when the prior-art constant velocity joint constructed as described above rotates, rolling frictional resistance and sliding frictional resistance are created on the roller bearings 109 and the spherical rollers 108, respectively, with a result that a force attributable to these resistance forces is created three times per one full rotation in the direction of compression and the direction of tension, axially of the second rotary shaft. By this force created axially of the second rotary shaft, the constant velocity joint 100 is vibrated, and when the rate of these vibrations coincides with the natural frequency of an object such as the vehicle body existing around the constant velocity joint 100, the vibration grows to thereby give discomfort to the seat occupant in some cases.

As a constant velocity joint for preventing the occurrence of vibration which leads to such an inconvenience, there is known one of the structure disclosed in Japanese Utility Model Laid-Open No. 62-49023 or Japanese Patent Application Laid-open No. 63-158327 (corresponding to U.S. Pat. No. 4,854,917). Of these, an embodiment shown in the former will now be described with reference to FIGS. 5 and 6 of the accompanying drawings.

In this constant velocity joint 110, as in the aforedescribed conventional constant velocity joint 100, recesses 113 extending in an axial direction of a first axis are formed at equal intervals in radial directions at three locations in the inner peripheral surface of a hollow cylindrical housing 112 fixed to the end portion of a first rotary shaft 121. However, the inner side surface 126 of each recess 113 is made into a flat surface parallel to a plane including a radial direction of the housing 112 and an axial direction of the recessed portion 113.

On the other hand, a tripod 115 fixed to the end portion of a second rotary shaft 122 such as the rotary shaft on the wheel side is constructed by securing three trunnions 117, for extending into the three recesses 113 formed in the housing 112, to the outer peripheral surface of a boss portion 116 to be fixed to the end portion of the second rotary shaft 122.

Further, in the case of this constant velocity joint 110, an inner guide ring 123 whose outer peripheral surface is made into a spherical convex surface is fitted around each of the three pillarlike trunnions 117. An outer guide ring 124 whose inner peripheral surface is made spherical is fitted around the inner guide ring 123 and further, a cylindrical roller 125 is rotatably supported outwardly thereof through a roller bearing 119.

This improved constant velocity joint 110 is constructed by combining the housing 112 and the tripod 115 together so that the cylindrical rollers 125 supported around the three trunnions 117 are fitted in the recesses 113 in the inner peripheral surface of the housing 112.

The action when the transmission of a rotational force is effected between the first and second rotary shafts 121 and 122 is substantially similar to that in the case of the aforedescribed constant velocity joint 100 (shown in FIG. 4). However, in the case of this constant velocity joint 110, a reduction in the force applied axially of the second rotary shaft 122 can be achieved to thereby prevent the vibration of the constant velocity joint 110.

In the case of the above-described constant velocity joint 110, the following problems newly arise.

As a first problem, mention may be made of the fact that the portions of engagement between the trunnions 117 on the tripod 115 side and the recesses 113 on the housing 112 side become large so that the outer diameter of the constant velocity joint 110 becomes large.

More particularly, the inner guide ring 123, the outer guide ring 124 and the roller bearing 119 are provided between the inner peripheral surface of the cylindrical roller 125 and the outer peripheral surface of each trunnion 117. Since the outer diameter of the trunnions 117 cannot be made small from the viewpoint of maintaining the strength, the outer diameter of each cylindrical roller 125 unavoidably becomes large. An increase in the outer diameter of the cylindrical rollers 125 leads to an increase in the widthwise dimension L of the recesses 113, which in turn leads to an increase in the outer diameter D of the housing 112.

However, it is often the case that the space of the portion of the driving system or the like of an automotive vehicle in which the constant velocity joint 100 or 110 is provided is narrow, and it is preferable that the constant velocity joint not become bulky. Particularly, it becomes difficult to provide the constant velocity joint 110 shown in FIGS. 5 and 6, instead of the constant velocity joint 100 shown in FIG. 4, and to adopt the improved constant velocity joint 110, it will become necessary in some cases to change the design of the surrounding portions such as the shape of the vehicle body.

In the case of the constant velocity joint described in the aforementioned U.S. Pat. No. 4,854,917, the outer peripheral surfaces of trunnions are made into a spherical shape, whereby the inner guide ring 123 in FIGS. 5 and 6 is eliminated. However, in the necessity of maintaining the strength of the trunnions, it is also difficult to make the outer diameter of the cylindrical rollers small and thus, there has been a similar problem.

As a second problem peculiar to the example of the prior art shown in FIGS. 5 and 6, mention may be made of the fact that it is difficult to make the full length of the rollers constituting the roller bearing 109 great, and thus the rotational resistance of the roller bearing 109 is liable to become great. That is, to make the outer diameter of the constant velocity joint 110 (the outer diameter D of the housing 112) small on the assumption that the outer diameters of the cylindrical rollers 125 are the same, it is effective to dispose all of the cylindrical rollers 125 and the members 123, 124 and 119 existing between them and each trunnion 117 inside the smallest circumscribed circle of the three trunnions 117 secured to the tripod 115. However, if this condition is satisfied and yet the roller bearing 119 is provided between the outer peripheral surface of the outer guide ring 124 and the inner peripheral surface of the cylindrical roller 125 as shown in FIG. 5. The rollers constituting the roller bearing 119 will be become small in length.

If the length of the rollers constituting the roller bearing 119 becomes small, each roller becomes liable to be inclined (skew) with respect to the center axis of the roller bearing 119 (which coincides with the center of the trunnion). If the rollers skew, the rolling resistance of the roller bearing 119 will become great and the resistance to relative displacement between the cylindrical rollers 125 and the inner side surfaces of the recesses 113 of the housing 112 will become great.

If the rollers are retained by a retainer to prevent skew, not only the cost of manufacture will increase due to an increase in the number of parts, but also the number of rollers assembled between the outer guide ring 124 and the cylindrical rollers 125 must be reduced. Thus, the load applied to each roller will increase and, fretting wear becomes liable to occur. For this reason, it is preferable not to use a retainer.

In another embodiment shown in the aforementioned Japanese Utility Model Laid-Open No. 62-49023, there is described a construction in which a cylindrical roller whose outer peripheral surface is made into a cylindrical surface is fitted to a spherical roller rotatably supported on the outer peripheral surface of a trunnion through a roller bearing. Because the widthwise dimension of the cylindrical roller is greater than the widthwise dimension of the spherical roller, the configuration of a housing having recesses into which the trunnions extend cannot be made small and thus, the constant velocity joint cannot be made compact. If an attempt is made to make the constant velocity joint compact, the full length of a plurality of rollers constituting a roller bearing will become small and the rolling resistance of the roller bearing will be liable to become great.

SUMMARY OF THE INVENTION

The tripod type constant velocity joint of the present invention has been made in order to solve the inconveniences as noted above.

Another object of the present invention is to present a tripod type constant velocity joint including a housing secured to a first shaft and presenting a cylindrical shape as a whole, a plurality of recesses extending axially with a predetermined width being formed in the inner peripheral surface of said housing at equal intervals in the circumferential direction of said housing, the side surfaces of each of said recesses being made into flat surfaces parallel to the axis of said housing, a tripod secured to a second shaft and having the same number of trunnions as said recesses, each of said trunnions presenting a short pillar-like shape and extending radially to be fitted into one of said recesses, a bearing fitted to each of said trunnions, a plurality of cylindrically-shaped spherical rollers each having an outer peripheral surface comprising a spherical convex surface and fitted to the outer side of one said bearing, and a plurality of cylindrical rollers each fitted to the outer side of one of said spherical rollers, the inner peripheral surface of each of said cylindrical rollers comprising a spherical concave surface which is in intimate contact with the outer peripheral surface of the corresponding one of said spherical rollers, the outer peripheral surface of each of said cylindrical rollers being in rolling contact with the side surfaces of the corresponding one of said recesses, with said bearings, said spherical rollers and said cylindrical rollers being disposed within a circle formed by linking the ends of said trunnions together.

According to the present invention, a constant velocity joint can be manufactured compactly and inexpensively in which a great force is not applied axially of the second rotary shaft. Therefore vibration is not liable to occur and moreover smooth transmission of a rotational force can be accomplished without great resistance being created.

Particularly, it becomes possible to provide a constant velocity joint of good performance having the same outer diameter as that of the heretofore used constant velocity joint. Therefore, it becomes possible to achieve improved performance of a rotation transmitting mechanism incorporating the constant velocity joint, such as the driving system of an FF vehicle, without changing the design of the portion such as the vehicle body in which the constant velocity joint is provided. In connection with this, it becomes also possible to use the heretofore used dust-proof boot or boot band belonging to the constant velocity joint.

BRIEF DESCRIPTION OF THE DRAWINGS

FIGS. 1 to 3 show an embodiment of the tripod type constant velocity joint of the present invention, FIG. 1 being an exploded perspective view showing the joint in its disassembled state with a housing removed, FIG. 2 being a fragmentary enlarged cross-sectional view, and FIG. 3 being an exploded perspective view showing a spherical roller and a cylindrical roller as they are disassembled from each other.

DESCRIPTION OF THE PREFERRED EMBODIMENTS

Figures 1, 3:
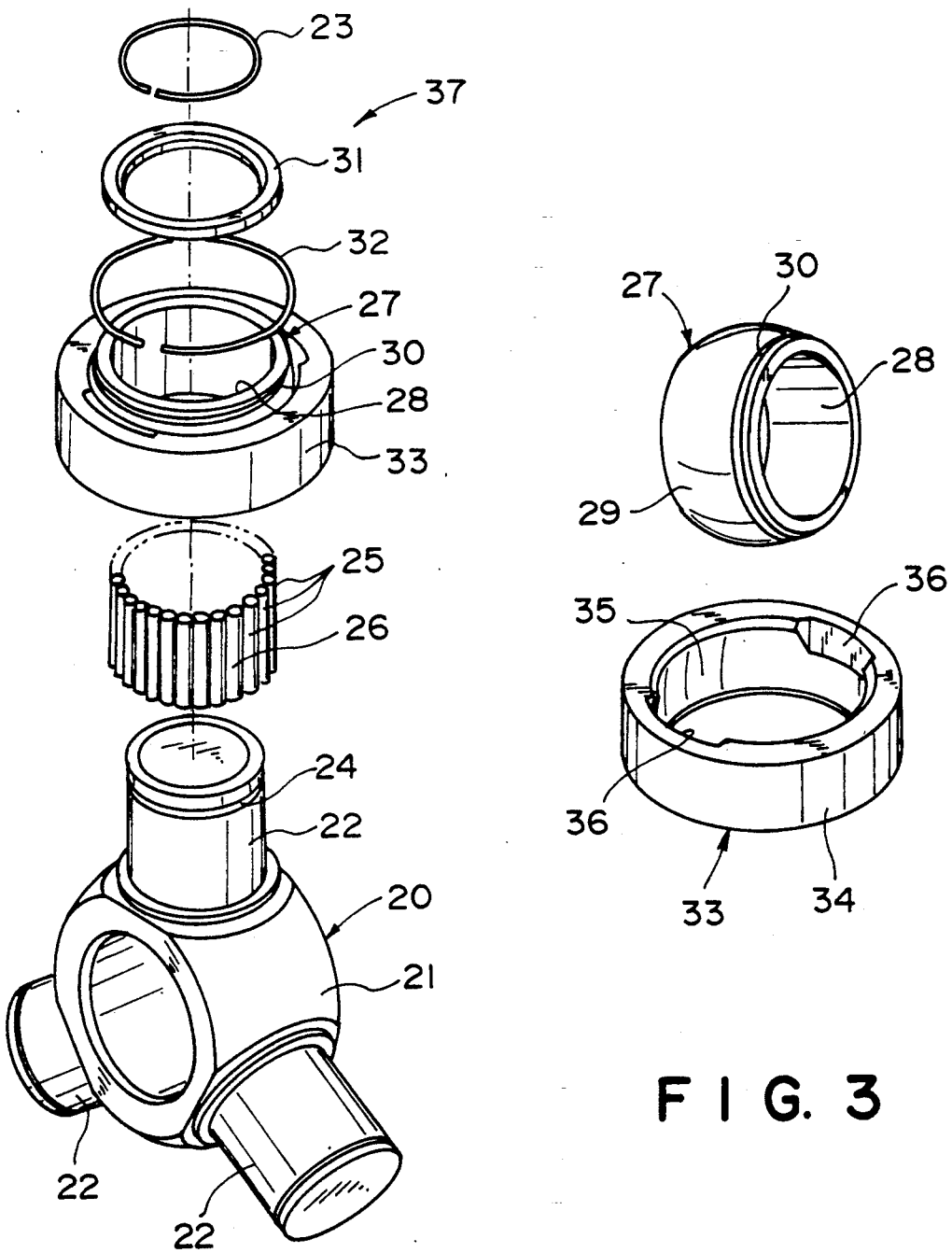
Figure 4:
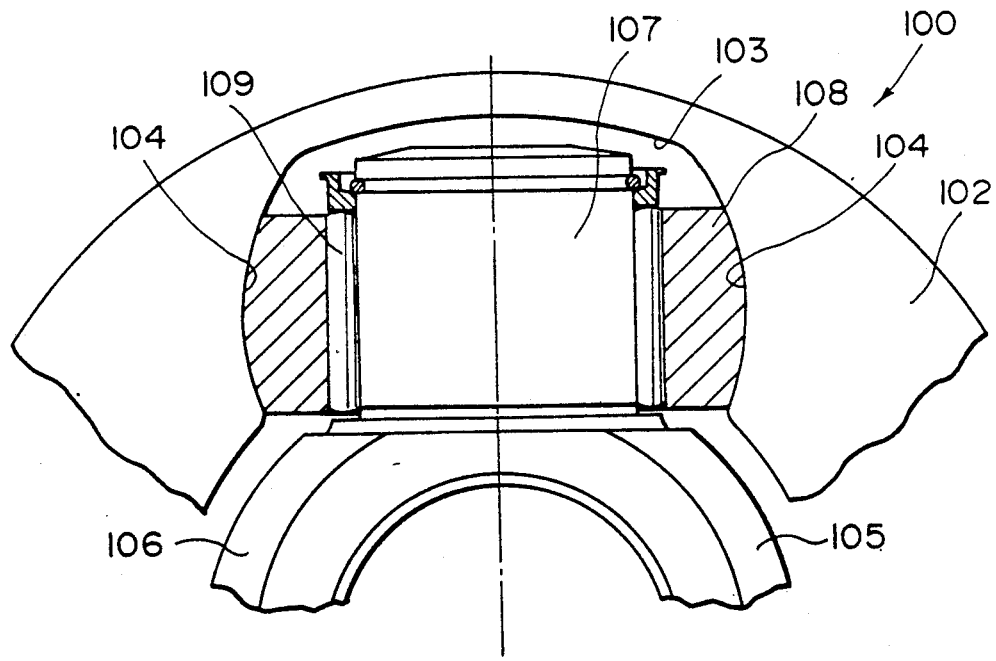
FIG. 4 is a fragmentary enlarged cross-sectional view of a tripod type constant velocity joint according to the prior art.
Figure 5:
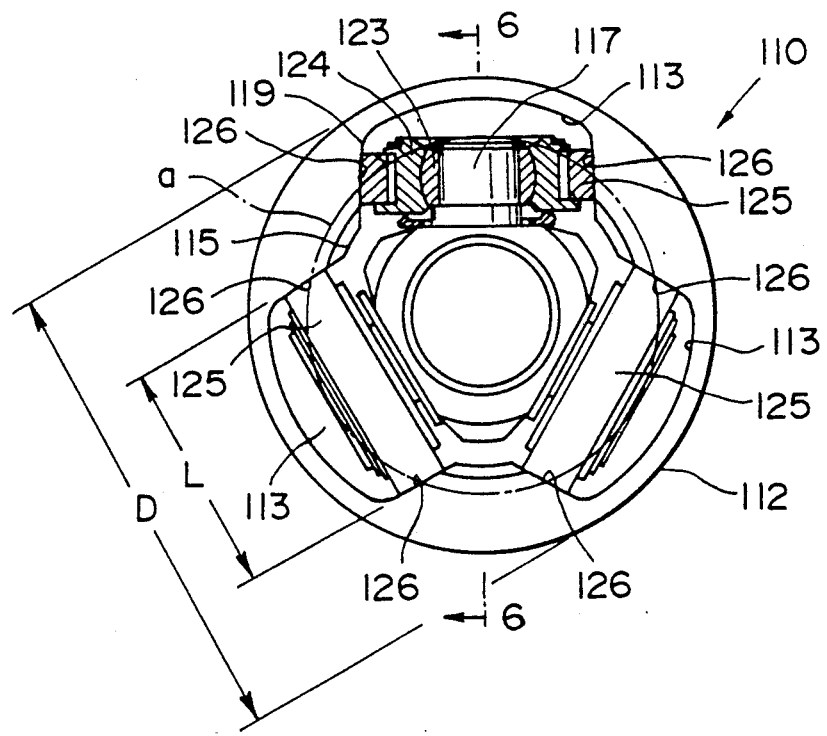
FIGS. 5 and 6 show an improved constant velocity joint according to the prior art, FIG. 5 being a fragmentary sectional front view, and FIG. 6 being a cross-sectional view taken along line 6—6 of FIG. 5.
Figure 6:
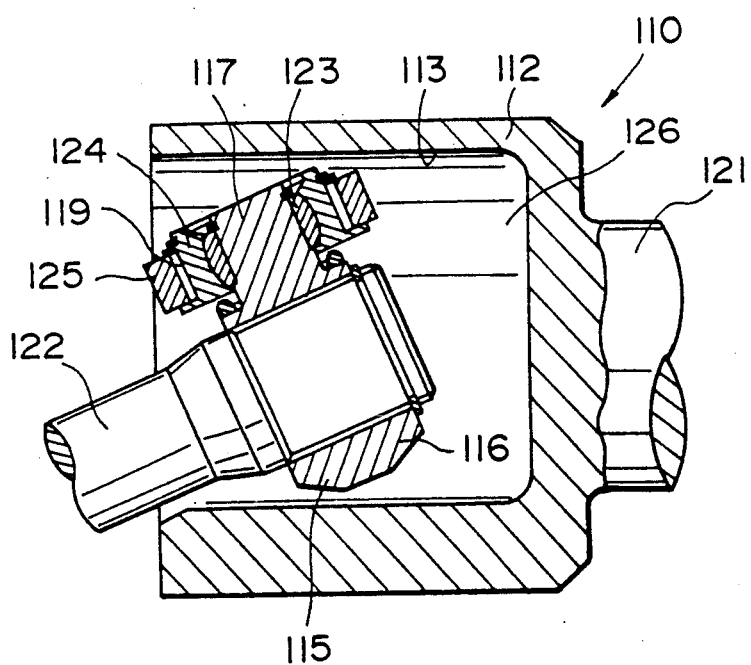

An embodiment of the present invention will hereinafter be described in greater detail with reference to the drawings.

A housing 17 (see FIG. 2) of the tripod type constant velocity joint of the present invention has its whole formed into a hollow thick-walled cylindrical shape, and radially concave recesses 18 are formed at equal intervals at three locations (only one of which is shown in FIG. 2) on the inner peripheral surface thereof. Each of the recesses 18 has a bottom surface 18' formed as a partial cylindrical surface centered about the housing axis, and on both sides thereof a pair of flat track surfaces 19 parallel to the radial direction of the housing 17, and more specifically, the radial direction of the recess 18.

Although not shown, a coupling portion for coupling and fixing the end portion of a first rotary shaft such as an engine side rotary shaft is provided on one end surface of the housing 17.

A tripod 20 comprises three trunnions 22 extending into the three recesses 18 formed in the inner peripheral surface of the housing 17, said trunnions 22 being secured to three locations on the outer peripheral surface of a boss portion 21 for coupling and fixing the end portion of a second rotary shaft such as a wheel side rotary shaft. Each trunnion 22 is formed into a short pillar-like shape, and a restraining groove 24 into which a restraining ring 23 to (be described) may be fitted is formed in the outer peripheral surface of the end portion of the trunnion over the full circumference thereof.

A spherical roller 27 is rotatably supported on the outer side of each of the three trunnions 22 through a roller bearing comprised of a plurality of rollers 25. This spherical roller 27, formed into an annular shape as a whole, has its inner peripheral surface 28 made into a cylindrical surface and has its outer peripheral surface 29 made into a spherical convex surface centered about a point c on the center line b of the trunnion 22. A C-shaped restraining ring 32 is mounted in an annular restraining groove 30 formed in one end portion of said outer peripheral surface 29 over the full circumference thereof so that a portion of the restraining ring 32 protrudes out of said annular groove 30.

An annular guide ring 31 is fitted to the end portion of the trunnion 22 rotatably supporting the spherical roller 27 as described above, and a restraining ring 23 is fitted in the restraining groove 24 situated in more toward the trunion end than the guide ring 31, whereby the guide ring 31 is prevented from slipping off the trunnion 22. Further, a cylindrical roller 33 is fitted to and supported by the radially outer side of the spherical roller 27 rotatably supported on the outer side of the trunnion 22.

The widthwise dimension w of this cylindrical roller 33, formed into an annular shape as a whole, is made smaller than the widthwise dimension W of the spherical roller 27. The outer peripheral surface 34 of roller is made into a cylindrical surface which is in rolling contact with the pair of track surfaces 19 provided in the recess 18 on the inner peripheral surface of the housing 17, and the inner peripheral surface 35 thereof is made into a spherical concave surface which is in intimate contact with the outer peripheral surface 29 of the spherical roller 27.

As shown in FIG. 3, a pair of cut-aways 36 for passing the spherical roller 27 therethrough are formed at diametrically opposite locations on the opening edge portion of one end surface of the cylindrical roller 33, thereby enabling the spherical roller 27 about the diameter of roller 33 on which cut-aways 36 are formed. in a state in which they are orthogonal to each other.

When the two rollers 27 and 33 are to be combined together into the state as shown in FIGS. 1 and 2, the two rollers 27 and 33 are first brought close to each other with the center axes thereof remaining deviated by 90° from each other as shown in FIG. 3, and the diametrically opposite end portions of the spherical roller 27 are passed through the inside of the cut-aways 36. Then, spherical roller 27 is rotated by 90° to be fitted into the cylindrical roller 33. Thereby, the spherical roller 27 and the cylindrical roller 33 are combined together into the state as shown in FIGS. 1 and 2.

The roller bearing 26, the spherical roller 27, the guide ring 31 and the cylindrical roller 33 having the relation of size as described above and supported outside the three trunnions 22 in the order (positional relation) as described above are all disposed inside the smallest circumscribed circle a' of the three trunnions 22. That is, that portion of a tripod side assembly 37 (the uniform speed joint except for the housing 17) which protrudes most outwardly is the end edges of the three trunnions 22, and the other members 26, 27, 31 and 33 do not protrude more than these.

Also, the cylindrical roller 33 is freely pivotable in all directions on the spherical roller 27 with the sliding movement of the outer peripheral surface 29 and the inner peripheral surface 35 each formed into a spherical shape. The amount of displacement is limited within the range of an angle $\alpha$ by the engagement between the restraining ring 32 mounted in the restraining groove 30 in the end portion of the outer peripheral surface 29 of the spherical roller 27 and the end edge portion of the cylindrical roller 33. This angle $\alpha$ is substantially equal to the angle of self-alignment based on the eccentric movement of the constant velocity joint. The angle of self-alignment of the constant velocity joint is of the order of 2.5° even when the angle formed by the first and second rotary shafts coupled to each other through the constant velocity joint becomes greatest and therefore, the value of the angle $\alpha$ which limits the displacement of the cylindrical roller 33 may be small.

The action when the transmission of the rotational force is effected between the first and second rotary shafts by the constant velocity joint of the present invention constructed as described above is substantially similar to that in the case of the conventional improved constant velocity joint. That is, when the first rotary shaft having one end thereof fixedly coupled, for example, to the housing 17 is rotated, this rotational force is transmitted from the housing 17 to the boss portion 21 of the tripod 20 through the cylindrical roller 33, the spherical roller 27, the roller bearing 26 and the trunnions 22, thereby rotating the second rotary shaft having the boss portion 21 fixed to one end portion thereof at a speed equal to that of the first rotary shaft.

In the case of the constant velocity joint of the present invention, the positional relation and the relation of size among the constituent members, 26, 27 and 33 are determined as by providing the roller bearing 26 most toward the trunnion 22, and making the widthwise dimension w of the cylindrical roller 33 existing remotely from the trunnion smaller than the widthwise dimension W of the spherical roller 27 existing near the trunnion (W>w). Thus, it has become possible to dispose all of the roller bearing 26, the spherical roller 27 and the cylindrical roller 33 within the smallest circumscribed circle a' of the three trunnions 22 secured to the tripod 20, and such that there will be little or no gap from the trunnion 22, the spherical roller 27 and the cylindrical roller 33 to the bottom surface 18' of the recess under a maximum joint angle. As a result, it has become possible to make the outer diameter of the housing 17 combined with the tripod side assembly 37 small to thereby make the constant velocity joint compact.

At the same time, it also becomes possible to make the length of the plurality of rollers 25 constituting the roller bearing 26 sufficiently great. Therefore, rollers 25 will no skew even without the use of a retainer, and the rolling resistance of the roller bearing 26 remains sufficiently small.

When displacement occurs between the housing 17 and the tripod 20, the rolling direction of the cylindrical roller 33 deviates relative to a plane including the axes of the trunnion 22 and the second rotary shaft by an angle of self-alignment based on the eccentric movement of the constant velocity joint. However, said angle of self-alignment is as small as the order of 2.5° at greatest as previously described. Moreover, the cylindrical roller 33 can change its direction of rolling by this amount of deviation relative to the trunnion 22 on the basis of its displacement relative to the spherical roller 27. Accordingly, no great frictional force works between the outer peripheral surface 34 of the cylindrical roller 33 and the track surfaces 19 on the housing 17 side, and the transmission of the rotational force by the constant velocity joint is always effected with a light force.

I claim:

1. A tripod type constant velocity joint for transmitting rotation at a constant velocity from a first shaft to a second shaft, including:
   a housing secured to said first shaft and presenting a cylnidrical shape as a whole, three recesses extending axially of said housing with a predetermined width being formed in the inner peripheral surface of said housing at equal intervals in the circumferential direction of said housing, with opposite side surfaces of each of said recesses being flat surfaces parallel to the axis of said housing;
   a tripod secured to said second shaft and having three trunnions, each of said trunnions presenting a short pillar-like shape and extending radially into a corresponding one of said recesses;
   a plurality of spherical rollers each having an outer peripheral surface comprising a spherical convex surface and being mounted to a corresponding trunnion via plural rolling bearing members disposed outside of said trunnion;
   a plurality of cylindrical rollers each fitted to the outer side of a corresponding one of said spherical rollers, the inner peripheral surface of each of said cylindrical rollers comprising a spherical concave surface which is in intimate contact with said spherical convex surface of the corresponding one of said spherical rollers, the outer peripheral surface of each of said cylindrical rollers being in rolling contact with said opposite side surfaces of the corresponding one of said recesses;
   said rolling bearing members, said spherical rollers and said cylindrical rollers being disposed within a circle formed by linking the ends of said trunnions together.

2. A tripod type constant velocity joint according to claim 1, comprising limiting means for limiting inclination of the axes of said cylindrical rollers in all directions relative to the axes of said spherical rollers to an angle substantially equal to an angle of self-alignment of the joint.

3. A tripod type constant velocity joint for transmitting rotation at a constant velocity from a first shaft to a second shaft, including:
   a housing secured to said first shaft and presenting a cylindrical shape as a whole, three recesses extending axially of said housing with a predetermined width being formed in the inner peripheral surface of said housing at equal intervals in the circumferential direction of said housing, with opposite side surfaces of each of said recesses being flat surfaces parallel to the axis of said housing;
   a tripod secured to said second shaft and having three trunnions, each of said trunnions presenting a short pillar-like shape and extending radially into a corresponding one of said recesses;
   a plurality of spherical rollers each having an outer peripheral surface comprising a spherical convex surface and being mounted to a corresponding trunnion via plural rolling bearing members disposed outside of said trunnion; and
   a plurality of cylindrical rollers each fitted to the outer side of a corresponding one of said spherical rollers, the inner peripheral surface of each of said cylindrical rollers comprising a spherical concave surface which is in intimate contact with said spherical convex surface of the corresponding one of said spherical rollers, the outer peripheral surface of each of said cylindrical rollers being in rolling contact with said opposite side surfaces of the corresponding one of said recesses;
   wherein a bottom surface of each of said recesses of said housing is formed as a partial cylindrical surface centered about the axis of said housing, and
   wherein as considered radially of said housing the dimension of said rolling bearing members is smaller than the dimension of said trunnions, the dimension of said spherical rollers is smaller than the dimension of said trunnions, and the dimension of said cylindrical rollers is smaller than the dimension of said spherical rollers, such that there is substantially no gap from respective peripheral portions of respective axial end surfaces of said trunnions, said spherical rollers and said cylindrical rollers to the bottom surfaces of said recesses under a maximum joint angle.

4. A tripod type constant velocity joint according to calim 3, comprising limiting means for limiting inclination of the axes of said cylindrical rollers in all directions relative to the axes of said spherical rollers to an angle substantially equal to an angle of self-alignment of the joint.

* * * * *